United States Patent
Wada

(10) Patent No.: US 6,622,081 B2
(45) Date of Patent: *Sep. 16, 2003

(54) CATALYST DETERIORATION DETECTING APPARATUS FOR INTERNAL COMBUSTION ENGINE

(75) Inventor: Shuichi Wada, Hyogo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/304,267

(22) Filed: May 6, 1999

(65) Prior Publication Data

US 2002/0099494 A1 Jul. 25, 2002

(30) Foreign Application Priority Data

Jan. 11, 1999 (JP) .......................... 11-004330

(51) Int. Cl.$^7$ ................................ F01N 11/00
(52) U.S. Cl. ........................ 701/114; 60/277
(58) Field of Search .............. 701/114; 60/277, 60/276; 73/118.1, 117.3

(56) References Cited

U.S. PATENT DOCUMENTS 5,591,905 A    1/1997   Fujimoto et al. ......... 73/118.1
5,722,238 A  * 3/1998   Tanahashi et al. .......... 60/276
5,727,383 A  * 3/1998   Yamashita et al. .......... 60/276

FOREIGN PATENT DOCUMENTS

JP    6-264725  *  9/1994
JP    7-225203     8/1995

* cited by examiner

*Primary Examiner*—Andrew M. Dolinar
(74) *Attorney, Agent, or Firm*—Sughrue Mion, PLLC

(57) ABSTRACT

A catalyst deterioration detecting apparatus for an internal combustion engine which can ensure an enhanced reliability for catalyst deterioration decision by reflecting accurately a parameter value indicative of engine load in a counter value and by detecting positively temperature rise state of catalyst. The apparatus includes an engine load detecting means (31) for determining arithmetically parameter values corresponding to load states of the engine (1), an accumulating means (32, 32B) for determining arithmetically an accumulated value (ΣQ) by adding accumulatively counter values corresponding to the parameter values (Qa), a first comparison means (33) for comparing the accumulated value (ΣQ) with a first predetermined value (α) corresponding to an operation temperature of a catalytic converter (10), and a catalyst deterioration decision means (102) for making decision as to deterioration of the catalytic converter (10) when the accumulated value (ΣQ) attains or exceeds the first predetermined value (α).

5 Claims, 12 Drawing Sheets

| INTAKE AIR QUANTITY Qa (g/sec) | 0 | 10 | 20 | 30 | 40 | 50 |
|---|---|---|---|---|---|---|
| COUNTER VALUE CTQa | 0 | 0 | 6 | 9 | 20 | 50 |

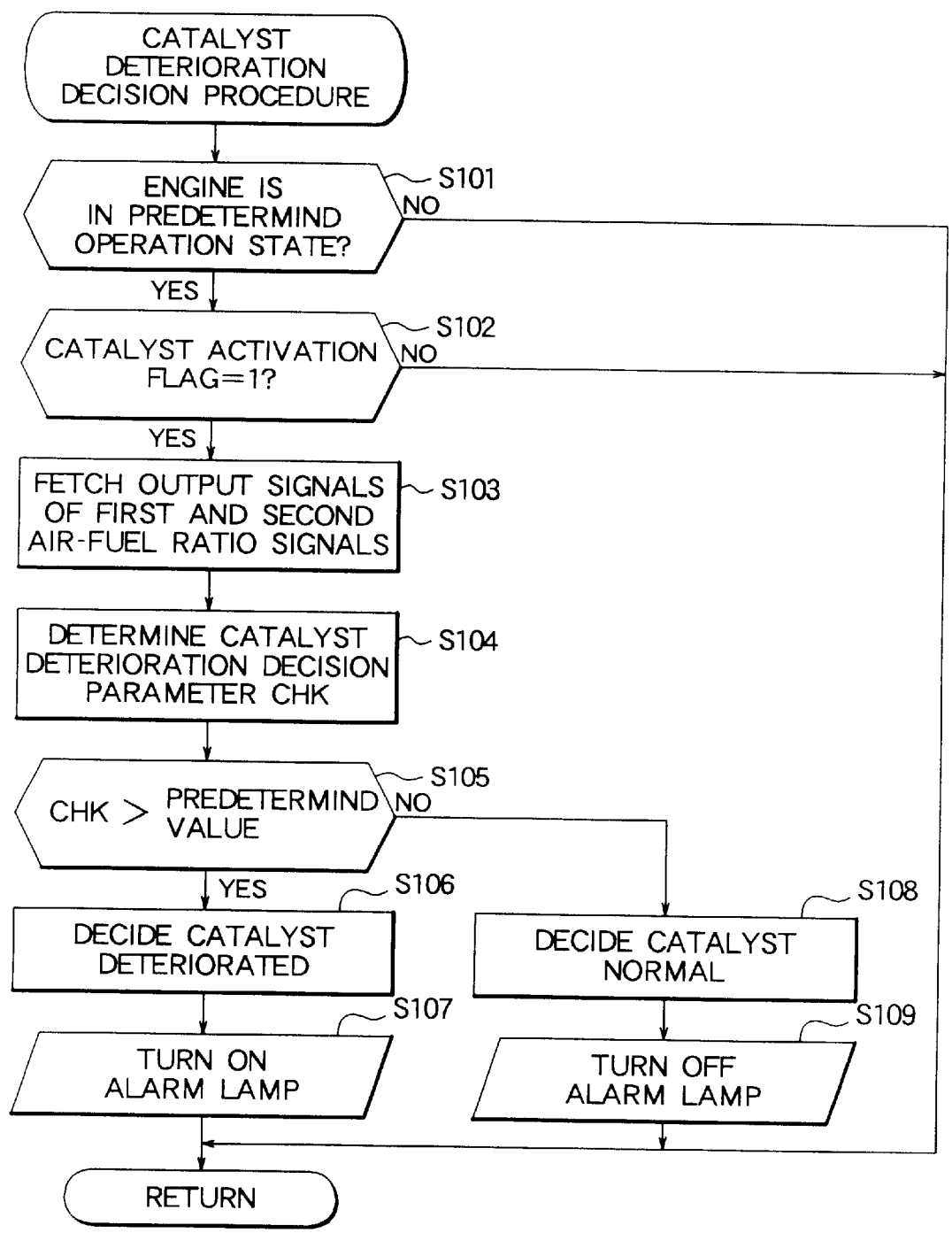

CATALYST DETERIORATION DETECTING APPARATUS FOR INTERNAL COMBUSTION ENGINE

BACKGROUND OF THE INVENTION

1. Field of the Invention

The present invention generally relates to an apparatus for detecting deterioration of a catalytic converter of an internal combustion engine while avoiding error by performing the decision as to deterioration of the catalytic converter in the state where the temperature thereof rises. More particularly, the invention is concerned with the catalyst deterioration detecting apparatus for an internal combustion engine which can detect deterioration of the catalytic converter with enhanced reliability and accuracy by detecting accurately the temperature-rise state of the catalyst and increasing the frequency of the chance for the catalyst deterioration decision.

2. Description of Related Art

Heretofore, in an internal combustion engine (hereinafter also referred to simply as the engine) of a motor vehicle, a catalytic converter has been employed for the purpose of eliminating harmful components such as HC (hydrocarbon), CO (carbon monoxide) and $NO_x$ (nitrogen oxides) from the exhaust gas of the engine for purification thereof.

On the other hand, since the combustion efficiency of the engine changes in dependence on the air-fuel ratio of a mixture gas charged into the engine, a feedback control of the air-fuel ratio (A/F) has been adopted in order to control the air-fuel ratio so that it can assume a stoichiometrically optimal value (e.g. 14.7) which conforms to the operation state of the engine. To this end, an air-fuel ratio sensor such as an $O_2$-sensor or the like is mounted in an exhaust pipe of the engine at a position upstream of the catalytic converter for realizing the air-fuel ratio feedback control.

In this conjunction, there has also been proposed such a dual-sensor type air-fuel ratio control system in which an additional air-fuel ratio sensor is additionally provided at a position downstream of the catalytic converter in order to protect the control performance of the system against degradation which may be brought about due to variance in the output characteristics among the air-fuel ratio sensors. A typical one of such dual-sensor type air-fuel ratio control systems is disclosed, for example, in U.S. Pat. No. 3,939,654.

In general, in the region of the exhaust pipe located downstream of the catalytic converter, the temperature of the exhaust gas is low and undergoes less change. Besides, the harmful components such as mentioned previously have been eliminated from the exhaust gas by the catalytic converter. Thus, the air-fuel ratio sensor mounted downstream of the catalytic converter is well protected against adverse influences. Additionally, it is noted that in the exhaust pipe region mentioned above, the exhaust gas has been mixed sufficiently, and thus the oxygen concentration is uniform.

Thus, the dual-sensor type air-fuel ratio control system such as mentioned above can realize the air-fuel ratio feedback control with high stability and accuracy, because the air-fuel ratio sensor disposed at the downstream side of the catalytic converter is stable in respect with the output characteristic thereof.

It is further noted that when the catalytic converter undergoes deterioration in the course of time lapse under the unfavorable conditions such as use of different fuels, exposure to unburned gas and the like, harmful exhaust gas will be discharged without being purified. Under the circumstances, such arrangement has also been adopted in which the states of the catalytic converter are detected on the basis of the output signals of the dual or paired air-fuel ratio sensors mentioned above, to thereby generate an alarm signal when deterioration of the catalytic converter is detected.

For better understanding of the present invention, the background techniques thereof will be reviewed below in some detail.

FIG. 9 is a functional block diagram showing schematically a basic arrangement of a hitherto known or conventional catalyst deterioration detecting apparatus for an internal combustion engine known heretofore which is disclosed, for example, in Japanese Unexamined Patent Application Publication No. 225203/1995 (JP-A-7-225203).

Referring to FIG. 9, an internal combustion engine (hereinafter referred to simply as the engine) 1 is provided with an exhaust pipe 15 for discharging an exhaust gas G from the engine 1 to the atmosphere. A catalytic converter 10 is installed in the exhaust pipe 15 for purifying on the whole the harmful components such as HC, CO and $NO_x$ contained in the exhaust gas G.

A first air-fuel ratio sensor 11 is mounted in the exhaust pipe at a position upstream of the catalytic converter 10 with a second air-fuel ratio sensor 12 being disposed downstream of the catalytic converter (hereinafter also referred to simply as the catalyst) 10, wherein the first and second air-fuel ratio sensors 11 and 12 output air-fuel ratio signals V1 and V2, respectively, which indicate the oxygen concentrations of the exhaust gas G prevailing at the locations of these sensors.

In FIG. 9, a catalyst activation decision means 101 makes decision on the basis of the engine operation state as to whether or not the catalyst 10 is activated (i.e., whether or not the temperature of the catalyst is sufficiently high). When it is decided that the catalyst 10 is activated, the catalyst activation decision means 101 issues an activation signal C.

Further provided is a catalyst deterioration decision means 102 which is designed to operate in response to the activation signal C for deciding on the basis of the air-fuel ratio signals V1 and V2 whether or not the catalyst 10 suffers deterioration.

Connected to the catalyst deterioration decision means 102 is an alarm means 19 which is actuated when deterioration of the catalyst is determined.

An air-fuel ratio control means 103 is adapted to perform the air-fuel ratio control for the engine 1 on the basis of the air-fuel ratio signals V1 and V2.

Next, description will be directed to the operation of the conventional air-fuel ratio control system shown in FIG. 9.

In the operating state of the engine 1, the harmful components such as mentioned previously are eliminated from the exhaust gas G discharged from the engine 1 by means of the catalytic converter 10. The air-flow ratio sensors 11 and 12 detect the oxygen concentrations of the exhaust gas G to output the air-fuel ratio signals V1 and V2, respectively, which assume different values in dependence on whether the air-fuel ratio of the exhaust gas G is lean or rich relative to the theoretical or stoichiometric air-fuel ratio.

The air-fuel ratio control means 103 performs the air-fuel ratio control for the engine 1 on the basis of the air-fuel ratio signals V1 and V2. On the other hand, the catalyst activation decision means 101 issues the activation signal C to the catalyst deterioration decision means 102 when it is decided that the catalyst 10 is in the activated state.

The catalyst deterioration decision means 102 operates only when the activation signal C is inputted, to thereby make decision as to the deterioration of the catalyst 10 on the basis of the air-fuel ratio signals V1 and V2. When deterioration of the catalyst is determined, the catalyst deterioration decision means 102 drives the alarm means 19 to issue an alarm signal.

FIG. 10 is a schematic block diagram showing a hardware arrangement of a conventional catalyst deterioration detecting apparatus for an internal combustion engine. In the figure, like parts or components as those described above by reference to FIG. 9 are denoted by like reference symbols, and repeated description thereof is omitted.

The engine 1 is equipped with an intake pipe 2 for supplying a mixture gas to the engine 1, wherein an air, cleaner 3 is disposed at a position close to an inlet port of the intake pipe 2 for the adsorbing and eliminating dusts and other particles carried by the air taken in. Further, an intake manifold 4 is formed at an interface portion between the engine 1 and the outlet port of the intake pipe 2.

In the engine system shown in FIG. 10, a fuel injector 5 for fuel injection into the engine is disposed within the intake pipe 2 at a position upstream of a throttle valve 7. It should however be appreciated that the fuel injector 5 may be disposed at a position downstream of the throttle valve 7. Of course, the fuel injector 5 may be provided in association with each of the individual engine cylinders.

A heated-wire type air-flow sensor 6 constitutes an engine operation state detecting means together with other various sensors described hereinafter and is adapted to detect an intake air quantity (intake air flow rate in g/sec) Qa supplied to the engine 1 from the intake pipe 2 through the intake manifold 4.

The throttle valve 7 mentioned above is installed within the intake pipe 2 at a position downstream of the fuel injector 5. Provided in association with the throttle valve 7 is a throttle sensor 8 which serves for detecting an opening degree of the throttle valve 7.

Implemented integrally with the throttle sensor 8 is an idle switch 9 which detects an idling operation state of the engine when the throttle valve 7 is fully closed, to thereby issue an idle signal A.

An ignition coil 13 which is constituted by a boosting transformer generates a high voltage for ignition in response to an ignition signal P supplied from an igniter 14 to thereby trigger the ignition of the gas mixture within the cylinder of the engine 1. As will be described hereinafter, the ignition signal P is supplied as a signal indicating rotation (rpm) of the engine 1 to an electronic control unit (hereinafter also referred to simply as the ECU in abbreviation) 100.

The igniter 14 is constituted by a power transistor serving for interrupting a current flowing through a primary winding of the ignition coil 13.

Further provided is a thermistor-type water temperature sensor 16 which serves for detecting a temperature Tw of water employed for cooling the engine 1.

Through manipulation of a key switch 17, power supply from an on-board battery 18 is started, whereupon operation of the ignition system is effectuated.

The alarm means 19 may be constituted, for example, by an alarm lamp which is driven or actuated upon every occurrence of various abnormal events.

Further provided is a vehicle speed sensor 20 which is designed for outputting as a vehicle speed signal Vs a pulse signal having a frequency which is in proportion to the rotation speed (rpm) of the axle of a motor vehicle on which the engine 1 is installed.

Provided in association with the catalyst 10 is a catalyst temperature sensor 22 for detecting the catalyst temperature Tc.

The ECU 100 which may be comprised of a microcomputer is designed to serve for the functions of the catalyst activation decision means 101, the catalyst deterioration decision means 102 and others for controlling the operations of the fuel injector 5, the alarm means 19 and others on the basis of the various sensor signals (i.e., engine operation state signals).

As the various sensor signals inputted to the ECU 100, there can be mentioned the intake-air quantity signal Qa generated by the air-flow sensor 6, the throttle opening degree signal $\theta$ supplied from the throttle sensor 8, the idle signal A generated by the idle switch 9, the first air-fuel ratio signal V1 originating in the first air-fuel ratio sensor 11, the second air-fuel ratio signal V2 originating in the second air-fuel ratio sensor 12, the ignition signal P generated in response to the interruption of the primary current flowing through the ignition coil 13, the cooling water temperature signal Tw supplied from the water temperature sensor 16, the vehicle speed signal Vs supplied from the vehicle speed sensor 20, and the catalyst temperature signal Tc supplied from the catalyst temperature sensor 22.

The ECU 100 is supplied with electric power from the onboard battery 18 upon closing of the key switch 17 to generate a driving signal supplied to the ignitor 14 in response to not only the air-fuel ratio signals V1 and V2 but also the other signals indicative of the engine operation states.

Furthermore, the ECU 100 determines arithmetically the fuel injection quantity on the basis of the air-fuel ratio signals V1 and V2 and the other engine operation state signals to thereby perform the feedback control of the air-fuel ratio with the aid of the driving signal supplied to the fuel injector 5. Additionally, the ECU 100 issues the actuation signal to the alarm means 19 upon occurrence of abnormal event.

Next, referring to flow charts of FIGS. 11 and 13 together with a waveform diagram of FIG. 12, description will be made of the catalyst activation decision processing procedure in the conventional air-fuel ratio control apparatus of the engine system shown in FIGS. 9 and 10. Parenthetically, FIG. 11 is a flow chart for illustrating processing procedure executed by the catalyst activation decision means 101 incorporated in the ECU 100, and FIG. 13 is a flow chart for illustrating processing procedure executed by the catalyst deterioration decision means 102 incorporated in the ECU 100. In FIG. 12, reference voltages VR1 and VR2 are used for determining rich and lean air-fuel ratios respectively.

In the description which follows, it is assumed that the catalyst temperature sensor 22 as employed is an inexpensive sensor which can not ensure measurement of the catalyst temperature over a wide range and that the catalyst activation decision means 101 incorporated in the ECU 100 is designed to arithmetically determine or estimate the activated state of the catalytic converter 10 (catalyst temperature) on the basis of the load state of the engine 1.

To this end, the catalyst activation decision means 101 includes a counter for measuring a time lapse under predetermined load conditions. By way of example, the catalyst activation decision means 101 may be so designed as to increment a counter value CNT in response to the intake air quantity Qa which bears correspondence to the engine load.

Now referring to FIG. 11, the catalyst activation decision means 101 makes decision as to whether or not the current catalyst activation decision processing is initial after the turn-on or closing of the key switch 17 (step S901).

When it is decided in the step 901 that the current catalyst activation decision processing is initial (i.e., when the decision step S901 results in affirmation "YES"), a catalyst activation flag and the counter value CNT are cleared to "0" (zero) in a step S902, whereon the processing proceeds to a step S903.

On the other hand, when the decision step 901 results in that the current catalyst activation decision processing is not initial (i.e., when the decision step S901 results in negation "NO"), the processing proceeds straightforwardly to the step S903.

In the step S903, the operation state signals of the engine 1 (i.e., signals indicative of the current engine state) are fetched, as described previously, and decision is made as to whether or not the engine operation state signals indicate rise of the temperature Tc of the catalyst (hereinafter also referred to as the catalyst temperature) in a step S904.

By way of example, when the intake air quantity Qa of the engine 1 attains or exceeds a predetermined intake air quantity Qa1, as illustrated in FIG. 12, it is decided that the catalyst temperature Tc has risen (i.e., "YES"). In this way, whenever the engine operation state indicates the rise of the catalyst temperature Tc, the counter value CNT is incremented by one (step S905).

Subsequently, the current counter value CNT is compared with a maximum counter value CNTmax to thereby decide whether or not the current counter value CNT is equal to or greater than the maximum counter value CNTmax (i.e., CNT≧CNTmax) in a step S906. In this conjunction, it should be mentioned that the maximum counter value CNTmax may be so set as to correspond to the catalyst temperature Tc risen up to the activation level Tc1 at which the catalyst is activated sufficiently.

When it is decided in the step S906 that the current counter value CNT is equal to or greater than the maximum counter value CNTmax (i.e., when the decision step S906 results in "YES"), the counter value CNT is held at the maximum counter value CNTmax with the catalyst activation flag being set to "1" (step S907).

By contrast, when it is decided in the step S906 that the current counter value CNT is smaller than the maximum counter value CNTmax (i.e., when the decision step S906 results in "NO"), the catalyst activation decision processing is terminated without executing any further processing.

At this juncture, it should be mentioned that the state where the counter value CNT is smaller than the maximum counter value CNTmax means that although the engine is in the operation state in which the catalyst temperature T increases (see period ta in FIG. 12), the catalyst 10 is not heated up to the activation temperature Tc1 and thus the counter value CNT is yet short of the maximum counter value CNTmax.

By contrast, when the counter value CNT is equal to or exceeds the maximum counter value CNTmax, this means that the catalyst temperature Tc becomes equal to or higher than the activation temperature Tc1 and that the catalyst 10 is in the state prevailing after an activation time point t1, as is illustrated in FIG. 12.

Accordingly, when the current counter value CNT becomes equal to or greater than the maximum counter value CNTmax, the catalyst activation flag is set to "1" for thereby indicating that the catalyst 10 is in the activated state, and the counter value CNT is maintained at the maximum counter value CNTmax.

On the other hand, when it is decided in the step S904 that the engine is not in the operation state in which the catalyst temperature Tc can increase (i.e., when the decision step S904 results in "NO"), the counter value CNT is decremented by one (step 908), whereupon decision is made as to whether the counter value CNT as decremented is "0" (zero) or not (step S909).

When it is decided that the current counter value CNT is not greater than "0" or CNT ≯ 0 (i.e., when the decision step S909 results in affirmation "YES"), the catalyst activation flag is reset to "0" (step S910), whereupon the catalyst activation decision processing illustrated in FIG. 11 comes to an end.

By contrast, when it is decided that the current counter value CNT is greater than "0" (i.e., when the decision step S909 results in negation "NO"), the catalyst activation decision processing is terminated straightforwardly.

At this juncture, it should be mentioned that the engine operation state in which the catalyst temperature Tc can not rise corresponds to the state in which the intake air quantity Qa is smaller than the predetermined intake air quantity Qa1, as can be seen from FIG. 12.

Further, the state in which the counter value CNT is greater than "0" means that although the catalyst 10 is in the activated state with the catalyst temperature Tc being higher than the activation temperature Tc1, the catalyst temperature Tc is lowering (period tb) even though the catalyst remains continuously to be in the activated state (see the state during a period tc illustrated in FIG. 12).

Accordingly, when the counter value CNT is greater than "0" (zero), the catalyst activation flag is held at "1", whereon the catalyst activation decision processing is terminated.

Furthermore, in the case where the counter value CNT is not greater than "0" (zero) (i.e., when CNT ≯ 0), indicating that the engine is not in operation state to increase the catalyst temperature, this means that the catalyst 10 is in the state prevailing in precedence to the period tc or alternatively in the state prevailing after the time point t2, as is illustrated in FIG. 12).

Thus, when the counter value CNT is not greater than "0" (zero), the counter value CNT and the catalyst activation flag are reset to "0", to thereby indicate the state in which the catalyst 10 is not activated.

Next, by referring to a flow chart of FIG. 13, description will be made of the catalyst deterioration decision processing procedure by the conventional apparatus.

Referring to FIG. 13, the catalyst deterioration decision means 102 makes decision on the basis of the engine operation state signals inputted to the ECU 100 as to whether or not the operation state of the engine 1 is a predetermined operation state (step S101).

At this juncture, it is contemplated with the phrase "predetermined engine operation state" to mean the state which is suited for the decision as to deterioration of the catalyst 10, i.e., a steady or cruising state of the engine or motor vehicle exclusive of the idling state and the accelerating/decelerating state.

When it is decided that the engine 1 is not in the predetermined engine operation state (i.e., when the decision step S101 results in negation "NO"), the catalyst deterioration decision processing illustrated in FIG. 13 is terminated straightforwardly.

By contrast, when it is found that the engine 1 is in the predetermined engine operation state (i.e., when the decision step S101 results in affirmation "YES"), then it is decided whether or not the catalyst activation flag is "1" (step S102).

When the catalyst activation flag is not "1", (i.e., when the decision step S102 results in "NO"), the catalyst deterioration decision processing is terminated without executing any further processing.

On the other hand, when it is decided that the catalyst activation flag is "1" (i.e., when answer of the decision step S102 is "YES"), this means that the catalyst 10 has been activated. Accordingly, the air-fuel ratio signals V1 and V2 are fetched for executing the decision as to the state of activation of the catalyst 10 (step S103), whereon a catalyst deterioration decision parameter CHK is determined arithmetically (step S104).

The catalyst deterioration decision parameter CHK may be determined in terms of a ratio of variation of the second air-fuel ratio signal V2 relative to that of the first air-fuel ratio signal V1. In general, so long as the catalyst 10 is normal, the variation or change of the second air-fuel ratio signal V2 remains small over the activation period to, as is indicated by a solid line curve in FIG. 12. However, when the catalyst 10 is abnormal, remarkable variation of the second air-fuel ratio signal V2 makes appearance during the activation period to, as is indicated by a broken line curve in FIG. 12.

Subsequently, decision is made whether or not the catalyst deterioration decision parameter CHK is greater than a predetermined value (step S105). When it is decided that the catalyst deterioration decision parameter CHK is greater than the predetermined value (i.e., when the decision step S105 results in "YES"), this means that the second air-fuel ratio signal V2 varies or changes with large magnitude of voltage at a relatively high frequency. Accordingly, it is determined that the catalyst 10 suffers deterioration (step S106).

In that case, the alarm means 19 is activated (step S107) to inform the driver of deterioration of the catalyst 10, whereupon the catalyst deterioration decision processing comes to an end.

By contrast, when it is found in the step S105 that the catalyst deterioration decision parameter CHK is not greater than the predetermined value (i.e., when the decision step S105 results in "NO"), this means that change of the second air-fuel ratio signal V2 is insignificant. Thus, it is determined that the catalyst 10 is normal (step S108).

In succession to the step S108, the alarm lamp 19 is opened (step S109) if the alarm lamp 19 is lit. Otherwise, the catalyst deterioration decision processing is terminated straightforwardly.

As is apparent from the foregoing description, with the conventional apparatus, decision as to deterioration of the catalyst 10 can be performed only in the state where the catalyst 10 has been activated.

However, the state in which the catalyst temperature Tc is rising or lowering can not definitely be determined only on the basis of the condition that the intake air quantity Qa is equal to or greater than the predetermined intake air quantity Qa1 or that the former is smaller than the latter, because the catalyst temperature Tc is affected by the actual value itself of the intake air quantity Qa as well.

Accordingly, it is impossible to determine positively the activation state of the catalyst 10 with high accuracy and reliability on the basis of only the conditions illustrated in FIGS. 11 and 12.

As is apparent from the foregoing description, in the conventional catalyst deterioration detecting apparatus for the internal combustion engine, decision as to deterioration of the catalyst 10 is performed on the presumption that the catalyst 10 is activated when the predetermined engine operation state in which the intake air quantity Qa is not smaller than the predetermined intake air quantity Qa1 has continues for a predetermined period ta. Consequently, there arises a problem that the actual catalyst temperature Tc can not be detected because of inadequacy of the conditions for incrementation/decrementation of the counter value CNT.

In other words, the conventional catalyst deterioration detecting apparatus suffers a problem that deterioration of the catalyst 10 can not be detected with high reliability because the activated state of the catalyst 10 can not be determined with high accuracy.

SUMMARY OF THE INVENTION

In the light of the state of the art described above, it is an object of the present invention to provide an improved catalyst deterioration detecting apparatus for an internal combustion engine which can ensure an enhanced reliability for the decision as to deterioration of the catalyst by using a parameter value(s) indicating the engine load(s) and reflected in the counter value, for thereby increasing the degree of freedom concerning the conditions for incrementation/decrementation of the counter value so that various dispersions as encountered in the processing(s) can be substantially canceled out for while increasing the chance of the catalyst deterioration decision by detecting the temperature rise state of the catalyst essentially without fail.

In view of the above and other objects which will become apparent as the description proceeds, there is provided according to a general aspect of the present invention a catalyst deterioration detecting apparatus for an internal combustion engine equipped with a catalytic converter for purifying exhaust gas thereof, which apparatus includes an engine load detecting means for determining arithmetically parameter values corresponding to load states of an internal combustion engine, an accumulating means for determining arithmetically an accumulated value by adding accumulatively counter values corresponding to the parameter values, a first comparison means for comparing the accumulated value with a first predetermined value corresponding to an operative temperature of a catalytic converter, and a catalyst deterioration decision means for making decision as to deterioration of the catalytic converter when the accumulated value attains or exceeds the first predetermined value.

By virtue of the arrangement mentioned above, the parameter value indicative of the engine load state can be reflected in the counter value, whereby an enhanced reliability can be ensured for the catalyst deterioration decision because the temperature rise state of the catalyst can be detected with high accuracy.

In a preferred mode for carrying out the invention, the catalyst deterioration detecting apparatus may further include a second comparison means for comparing the parameter value with a second predetermined value relevant to the temperature rise state of the catalyst. In that case, the accumulating means can be so designed as to determine arithmetically the accumulated value when the parameter value attains or exceeds the second predetermined value.

With this arrangement, reliability of the catalyst deterioration decision can further be enhanced.

In another preferred mode for carrying out the invention, the engine load detecting means may be so designed as to arithmetically determine the intake air quantity of the engine as the parameter value. In this case, reliability of the catalyst deterioration decision can equally be enhanced.

In yet another preferred mode for carrying out the invention, the engine load detecting means may be so arranged as to arithmetically determine as the parameter value a negative pressure which is prevailing within an intake pipe of the engine. Similar advantageous effects as mentioned above can be achieved.

In still another preferred mode for carrying out the invention, the engine load detecting means may be so designed as to determine arithmetically a throttle opening degree as the aforementioned parameter value.

Owing to the arrangements described above, the catalyst deterioration detecting apparatus can reflect correctly and accurately the parameter values indicative of the engine loads in the counter values, whereby enhanced reliability can be ensured for the catalyst deterioration decision because of capability of detecting the operative state of the catalyst positively and reliably.

In a further preferred mode for carrying out the invention, the accumulating means may be so designed as to incorporate a data table or map for determining arithmetically the counter value(s) corresponding to the parameter value(s).

In a yet further preferred mode for carrying out the invention, the catalyst deterioration detecting apparatus may additionally be provided with a third comparison means for comparing the parameter value with a third predetermined value relevant to the temperature fall state of the catalyst. In that case, the accumulating means can be so designed as to subtract a counter value corresponding to the parameter value from the accumulated value if the parameter value is not greater than the third predetermined value.

In a still further preferred mode for carrying out the invention, the third predetermined value may be set at a value smaller than the second predetermined value, and the accumulating means may be so arranged as to hold the accumulated value as it is when the parameter value assumes a value falling between the second predetermined value and the third predetermined value.

In yet another preferred mode for carrying out the invention, in the case where the parameter value is not greater than the third predetermined value, the accumulating means may be so designed as to set a subtraction-destined counter value to be variable in dependence on the accumulated value at the time point the parameter value is detected.

In still another preferred mode for carrying out the invention, the accumulating means may be so implemented as to set the subtraction-destined counter value to be smaller as the accumulated value at the time point of detection of the parameter value is increasing.

In a further preferred mode for carrying out the invention, the catalyst deterioration detecting apparatus may additionally include an engine operation state decision means for deciding whether or not the operation state of the engine falls within a predetermined operation range. In that case, the accumulating means can be so designed as to suspend the arithmetic operation for determining the accumulated value if the operation state of the engine falls within the predetermined operation range.

In another preferred mode for carrying out the invention, the engine operation state decision means may be so implemented as to determine that the engine operation state falls within the predetermined operation range to thereby maintain the accumulated value, in case the engine is operating in an enrich mode.

In a further preferred mode for carrying out the invention, the engine operation state decision means may be so designed as to determine that the engine operation state falls within the predetermined operation range when the engine is operating in other modes than the air-fuel ratio feedback control mode, to thereby hold the accumulated value as it is.

In a still further preferred mode for carrying out the invention, the catalyst deterioration detecting apparatus may be additionally provided with a fuel-cut mode decision means for deciding whether or not the engine is operating in the fuel-cut mode. In that case, the accumulating means can be so designed as to execute the arithmetic operation for subtracting the accumulated value if the engine is operating in the fuel-cut mode.

With the arrangements described above, there can be realized the improved catalyst deterioration detecting apparatuses for the internal combustion engine which can ensure the enhanced reliability for the decision as to deterioration of the catalyst by using the parameter value(s) indicating the engine load(s) and reflected in the counter value(s) while increasing the degree of freedom concerning the conditions for incrementation/decrementation of the counter value so that various variable factors as encountered in the processing can be compensated for and that the frequency of the chance of the catalyst deterioration decision performed by detecting the temperature rise state of the catalyst can be increased. Thus, significantly advantageous effects can be achieved by the present invention.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 13 is a flow chart for illustrating the catalyst deterioration decision procedure performed by the conventional apparatus.

DESCRIPTION OF THE PREFERRED EMBODIMENTS

Figure 1:
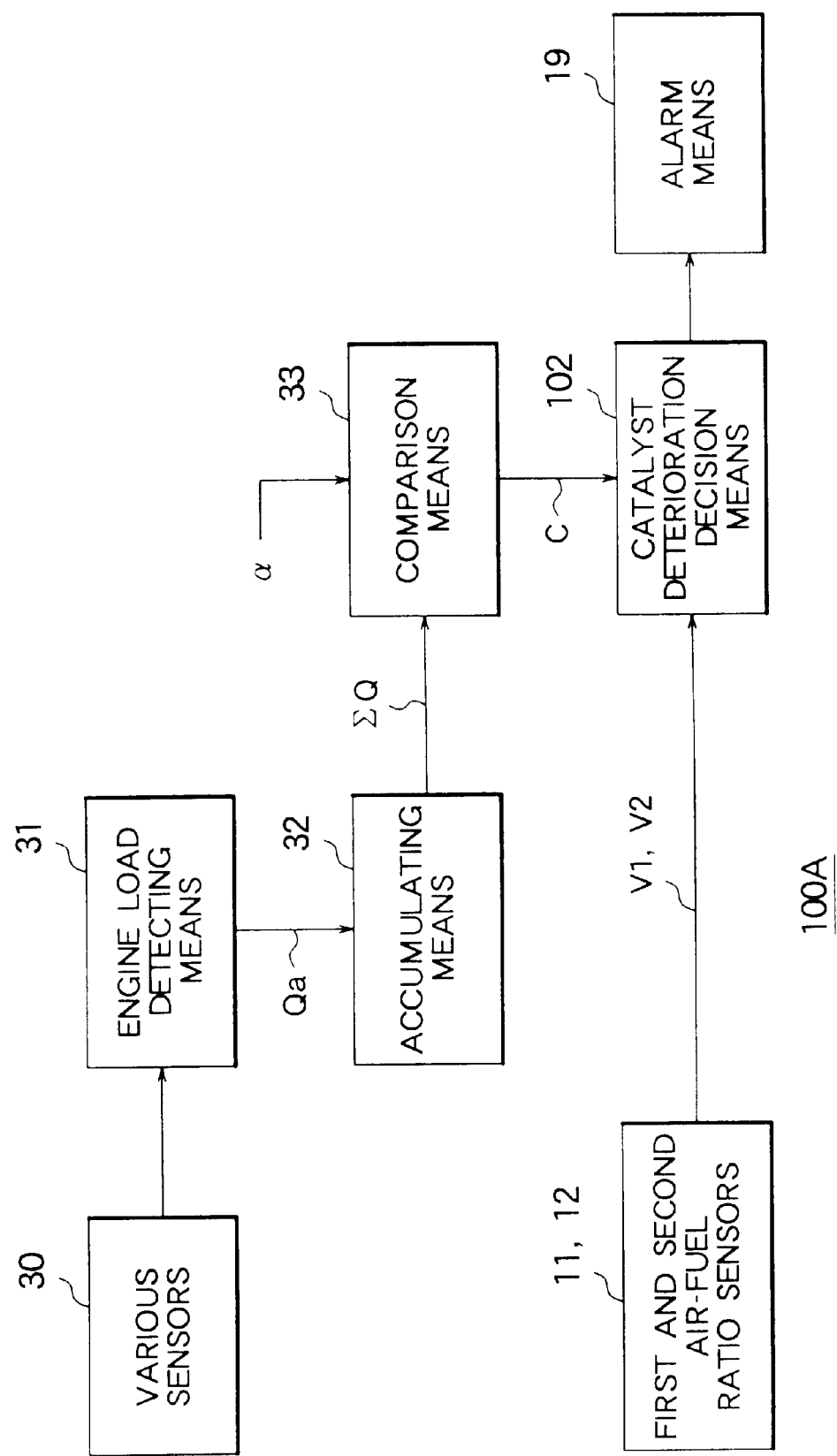
FIG. 1 is a functional block diagram showing schematically a general arrangement of a catalyst deterioration detecting apparatus for an internal combustion engine according to a first embodiment of the present invention.

The present invention will be described in detail in conjunction with what is presently considered as preferred or typical embodiments thereof by reference to the drawings. In the following description, like reference characters designate like or corresponding parts throughout the several views.

EMBODIMENT 1

Figure 9:
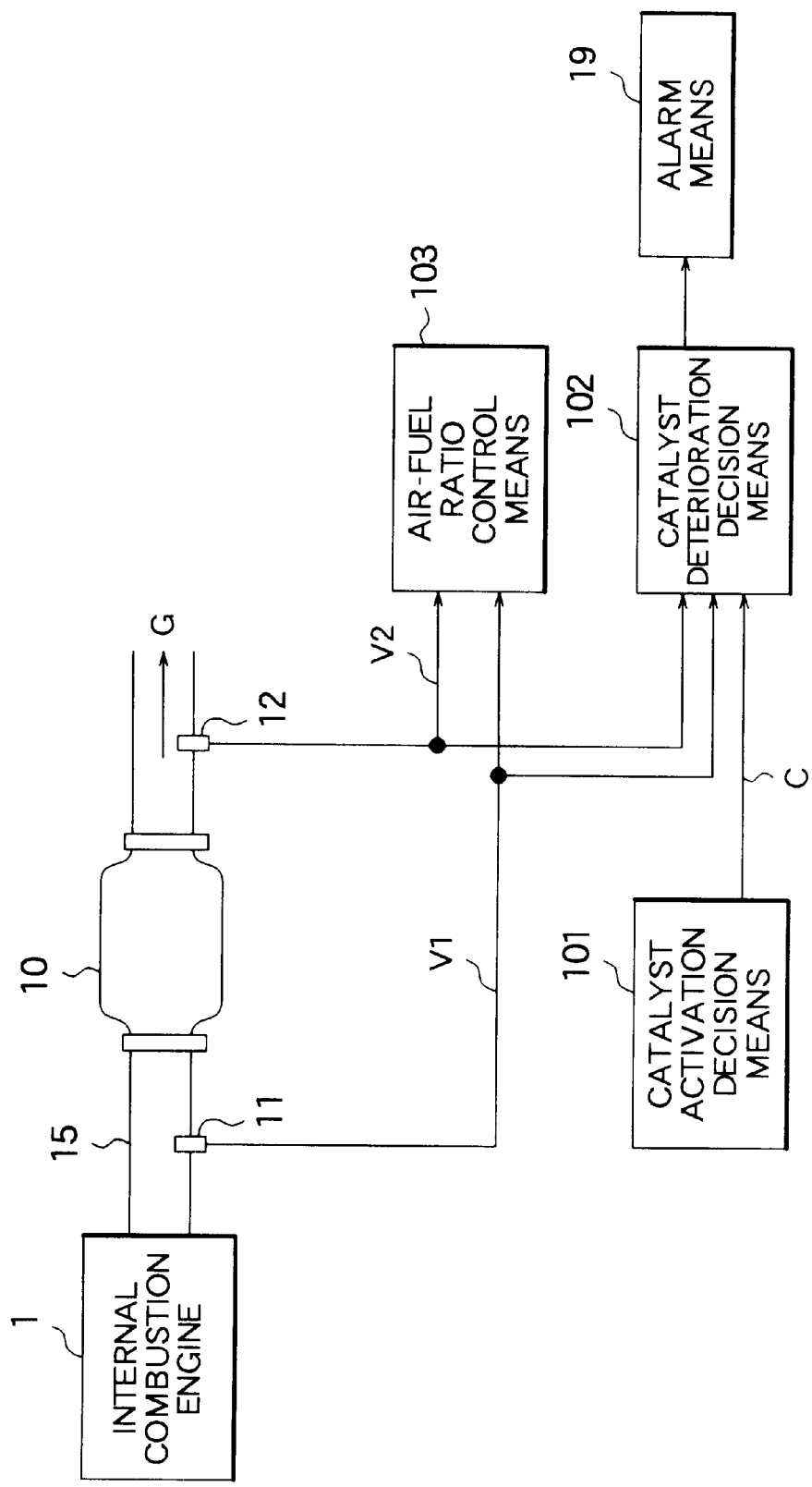
FIG. 9 is a functional block diagram showing an arrangement of a hitherto known catalyst deterioration detecting apparatus for an internal combustion engine.
Figure 10:
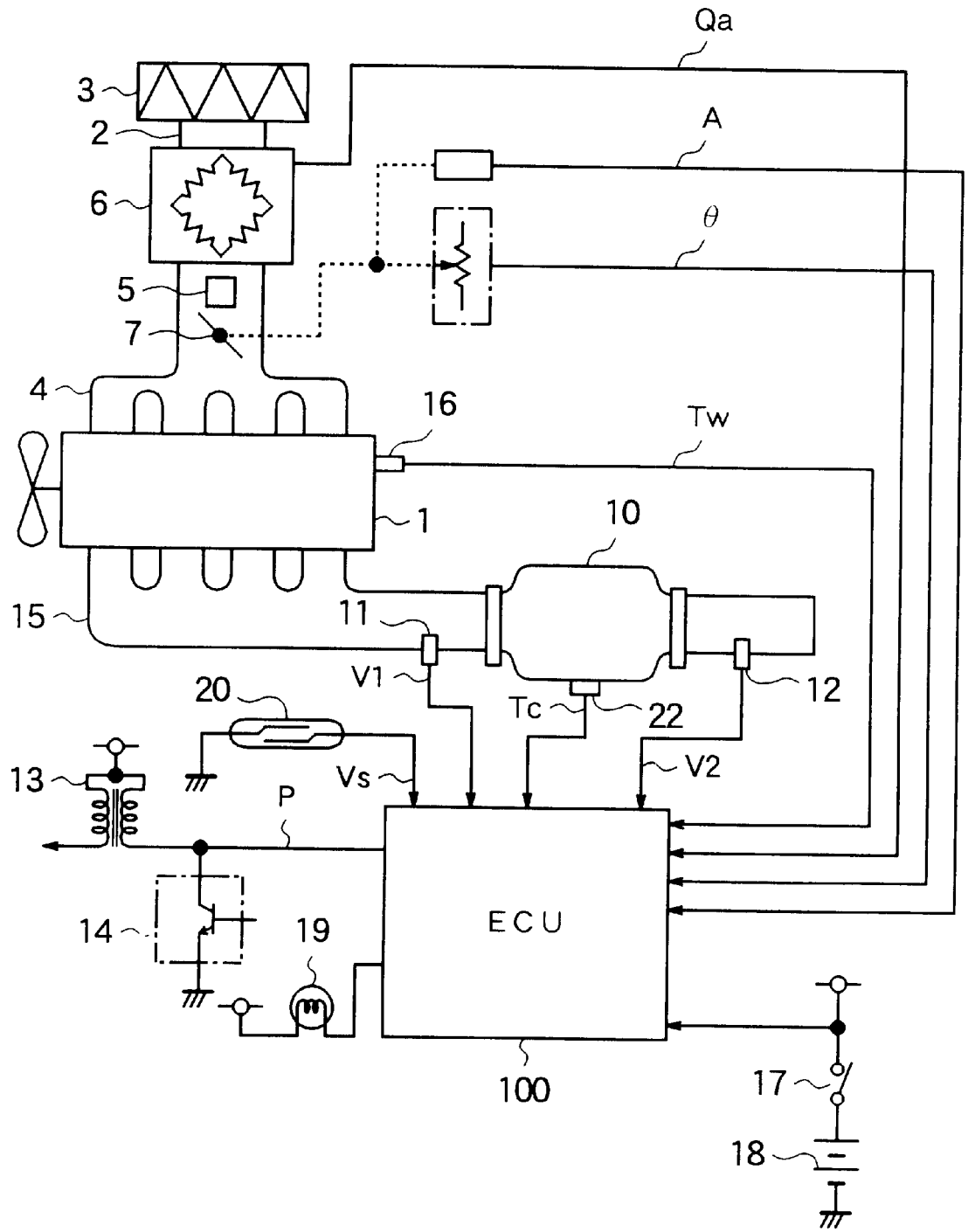
FIG. 10 is a block diagram showing an arrangement of an engine system equipped with the conventional catalyst deterioration detecting apparatus and an air/fuel ratio control system.
Figure 11:
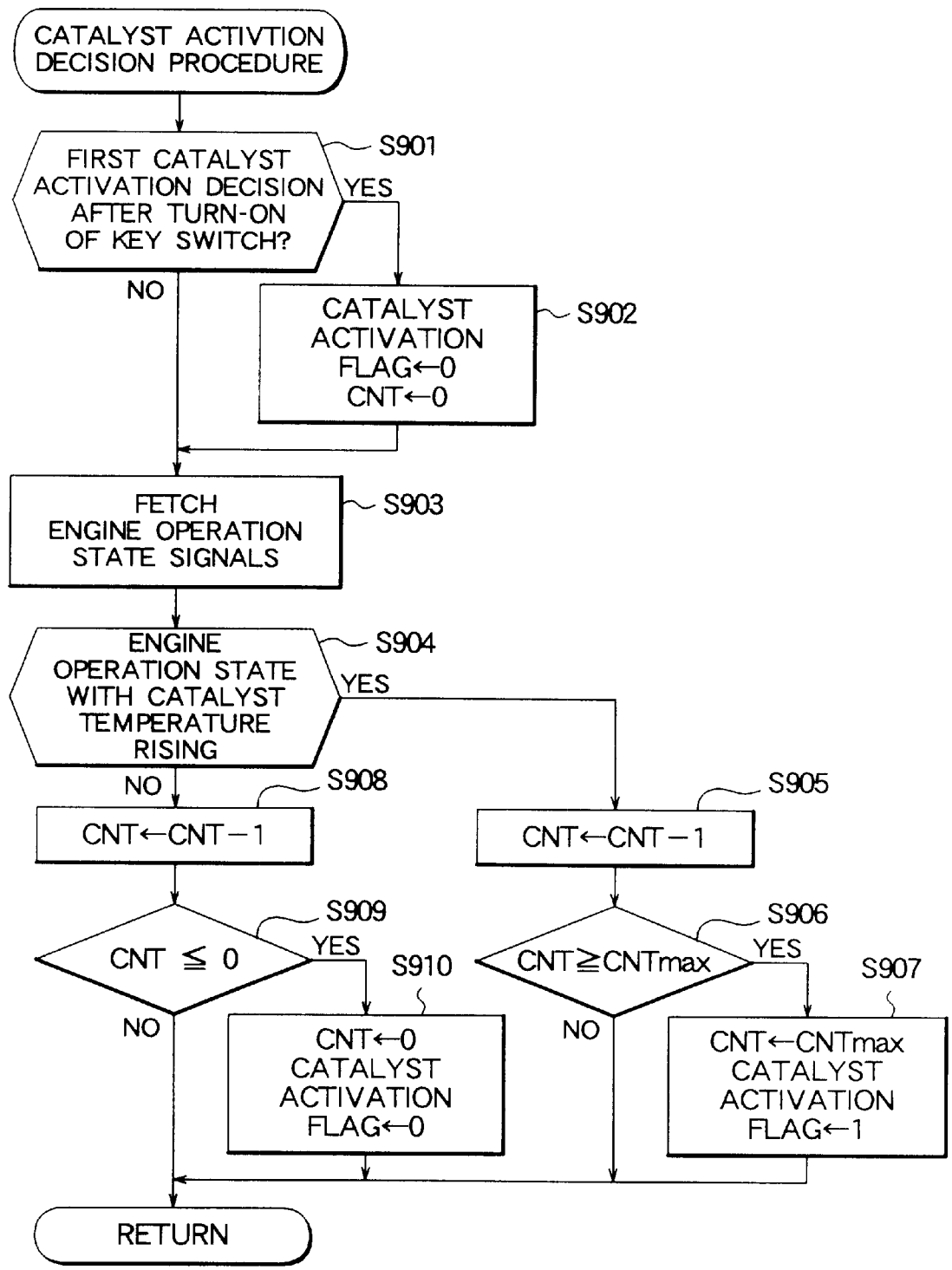
FIG. 11 is a flow chart for illustrating operation of the conventional catalyst deterioration detecting apparatus.
Figure 12:
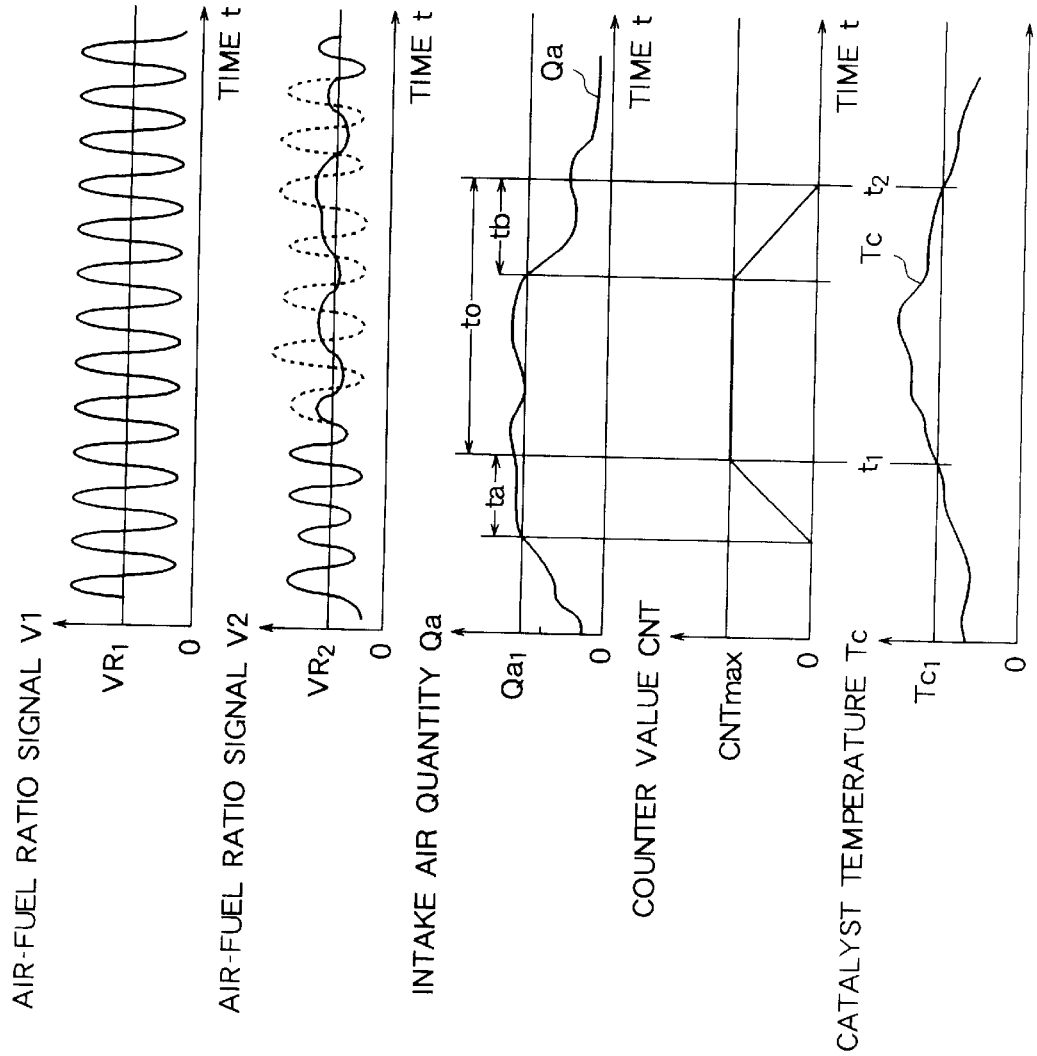
FIG. 12 is a waveform diagram for graphically illustrating catalyst activation decision procedure executed by the conventional catalyst deterioration detecting apparatus.

FIG. 1 is a functional block diagram showing a general arrangement of a catalyst deterioration detecting apparatus for an internal combustion engine according to a first embodiment of the present invention. In the figure, like parts or components as those described hereinbefore by reference to FIGS. 9 and 10 are denoted by like reference symbols, and repeated description thereof is omitted.

Referring to FIG. 1, an electronic control unit (hereinafter also referred to simply as the ECU) 100 corresponds to the ECU 100A shown in FIG. 10 and differs from the latter only in that the processing program or procedure is partly altered. Further, the catalyst deterioration decision means 102 according to the instant embodiment of the invention differs from that of the conventional apparatus only in respect to the conditions for operation which have been described hereinbefore by reference to FIG. 9. The other structural features which are not shown in FIG. 1 are substantially the same as those shown in FIGS. 9 and 10.

The ECU 100A is comprised of an engine load detecting means 31 for determining an intake air quantity (intake air flow rate in g/sec) Qa as a parameter value corresponding to the load state of an internal combustion engine 1 (see FIG. 9) on the basis of output signals of various sensors 30, an accumulating means 32 for determining arithmetically an integrated or accumulated value ΣQ by adding accumulatively the counter values corresponding to the intake air quantities Qa (parameter values), and a comparison means 33 for comparing the accumulated value ΣQ with a predetermined value α corresponding to the catalyst operation temperature at which the catalytic converter 10 is operative.

The engine load detecting means 31, the accumulating means 32 and the comparison means 33 as a whole correspond to the catalyst activation decision means 101 described hereinbefore (see FIG. 9), wherein an activation signal C (i.e., an activation flag "1") is issued from the comparison means 33 when it is decided on the basis of the engine load (i.e., the intake air quantity Qa) that a temperature of the catalytic converter 10 has reached the operation temperature at which the catalyst is operative.

In the apparatus according to the instant embodiment of the invention, an air-flow sensor 6 (see FIG. 10) is installed as one of the various sensors 30. The engine load detecting means 31 fetches the intake air quantity signal Qa supplied from the air-flow sensor 6 to thereby output the very intake air quantity Qa as the parameter value which corresponds to the engine load.

In this conjunction, it should be mentioned that the accumulating means 32 may use the intake air quantity Qa itself intactly as a counter value corresponding to the parameter value.

The catalyst deterioration decision means 102 incorporated in the ECU 100A decides on the basis of the air-fuel ratio signals V1 and V2 whether or not the catalyst 10 (see FIG. 9) suffers deterioration when the accumulated value ΣQ becomes equal to or greater than a predetermined value α.

Next, by referring to a flow chart of FIG. 2, description will be made of operation of the catalyst deterioration detecting apparatus shown in FIG. 1.

Figures 2, 3:
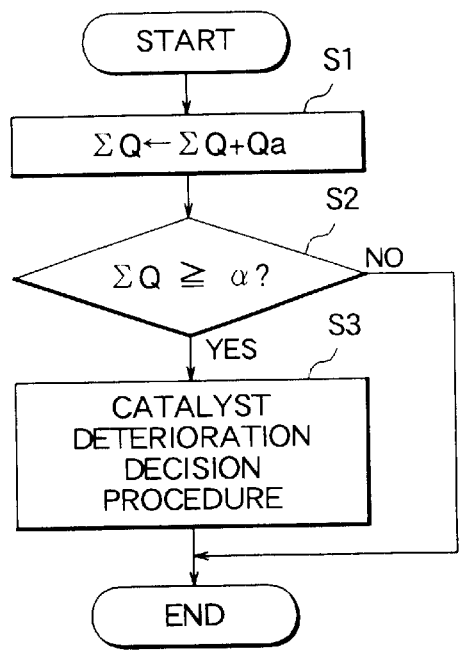
FIG. 2 is a flow chart for illustrating an accumulating processing procedure executed by the catalyst deterioration detecting apparatus according to the first embodiment of the invention.
FIG. 3 is a view for illustrating a data table or map to be referenced in executing arithmetic operation according to a third embodiment of the present invention.

The processing routine illustrated in FIG. 2 corresponds to the operations of the accumulating means 32, the comparison means 33 and the catalyst deterioration decision means 102. This processing routine is started upon closing of the ignition switch and repeated periodically at a predetermined interval through a timer processing.

In the catalyst deterioration detecting apparatus now under consideration, it is presumed that the engine load detecting means 31 outputs the intake air quantity signal Qa as the parameter value corresponding to the engine load, while the accumulating means 32 accumulates the intake air quantities Qa as the counter values to arithmetically determine the accumulated value ΣQ.

Now referring to FIG. 2, the accumulating means 32 is put into operation at a time point when the ignition switch is closed to accumulate sequentially the intake air quantities Qa inputted from the engine load detecting means 31, for thereby determining arithmetically the accumulated value ΣQ (step S1).

Subsequently, the comparison means 33 compares the accumulated value ΣQ with a predetermined value α every time when the accumulated value ΣQ determined by the accumulating means 32 is updated, to thereby decide whether or not the accumulated value ΣQ is equal to or greater than the predetermined value α (step S2).

When it is decided that the accumulated value ΣQ is smaller than the predetermined value α or ΣQ<α (i.e., when the decision step S2 results in negation "NO"), the processing routine illustrated in FIG. 2 is terminated, whereon return is made to the start-ready state (START).

On the other hand, when it is decided in the step S2 that the accumulated value ΣQ is equal to or greater than the predetermined value α or ΣQ>α (i.e., when the decision step S2 results in affirmation "YES"), the catalyst deterioration decision processing described hereinbefore (see FIG. 13) is executed by the catalyst deterioration decision means 102 (step S3), whereon the processing routine illustrated in FIG. 2 comes to an end (END).

As can be understood from the foregoing, by using the accumulated value ΣQ of the intake air quantities Qa (parameter values) which bear close relation to the catalyst temperature, the intake air quantity Qa itself can be reflected in the accumulated value ΣQ of the counter values. Thus, it is possible to estimate the catalyst temperature with high accuracy without resorting to the use of an expensive catalyst temperature sensor.

More specifically, the amount of the exhaust gas increases as the intake air quantity Qa of the engine 1 increases, which results in that the temperature of the catalyst 10 rises at a high rate. Accordingly, in order to reflect the intake air quantity Qa in the accumulated value ΣQ employed for the catalyst temperature decision, the intake air quantities Qa as detected are sequentially added or accumulated in the step S1.

Accordingly, when the accumulated value ΣQ of the intake air quantity Qa increases as a function of time lapse to reach the predetermined value $\underline{\alpha}$, it can be determined with high reliability that the temperature of the catalyst 10 has risen to the operative temperature. In this way, erroneous detection of deterioration of the catalyst (and hence erroneous actuation of the alarm means 19) can be avoided essentially without fail.

EMBODIMENT 2

In the case of the catalyst deterioration detecting apparatus according to the first embodiment of the invention, the intake air quantity Qa is employed as the parameter value corresponding to the engine load. However, negative pressure prevailing within the intake pipe of the engine 1 may be made use of as another type of the parameter value.

Thus, in the catalyst deterioration detecting apparatus according to a second embodiment of the invention, a pressure sensor (not shown) is provided in the intake pipe 2 (see FIG. 10), the engine load detecting means 31 is so designed as to output the negative pressure within the intake pipe 2 as the parameter value.

Further, a throttle opening degree θ may be used as the parameter value corresponding to the engine load. Thus, in the catalyst deterioration detecting apparatus according to a modification of the instant embodiment, the engine load detecting means 31 may be so designed as to output as the parameter value the throttle opening degree signal $\underline{\theta}$ available from the throttle position sensor 8.

Furthermore, charging efficiency of the engine 1 calculated on the basis of the intake air quantity Qa and the engine rotation number (rpm) may equally be used as the parameter value.

EMBODIMENT 3

In the case of the catalyst deterioration detecting apparatus according to the first embodiment of the invention, the intake air quantities Qa (i.e., the parameter values) are intactly accumulated as the counter values by the accumulating means 32 to thereby determine arithmetically the accumulated value ΣQ. However, the accumulated value may be determined after having determined the counter values through a map-based arithmetic procedure.

Figure 4:
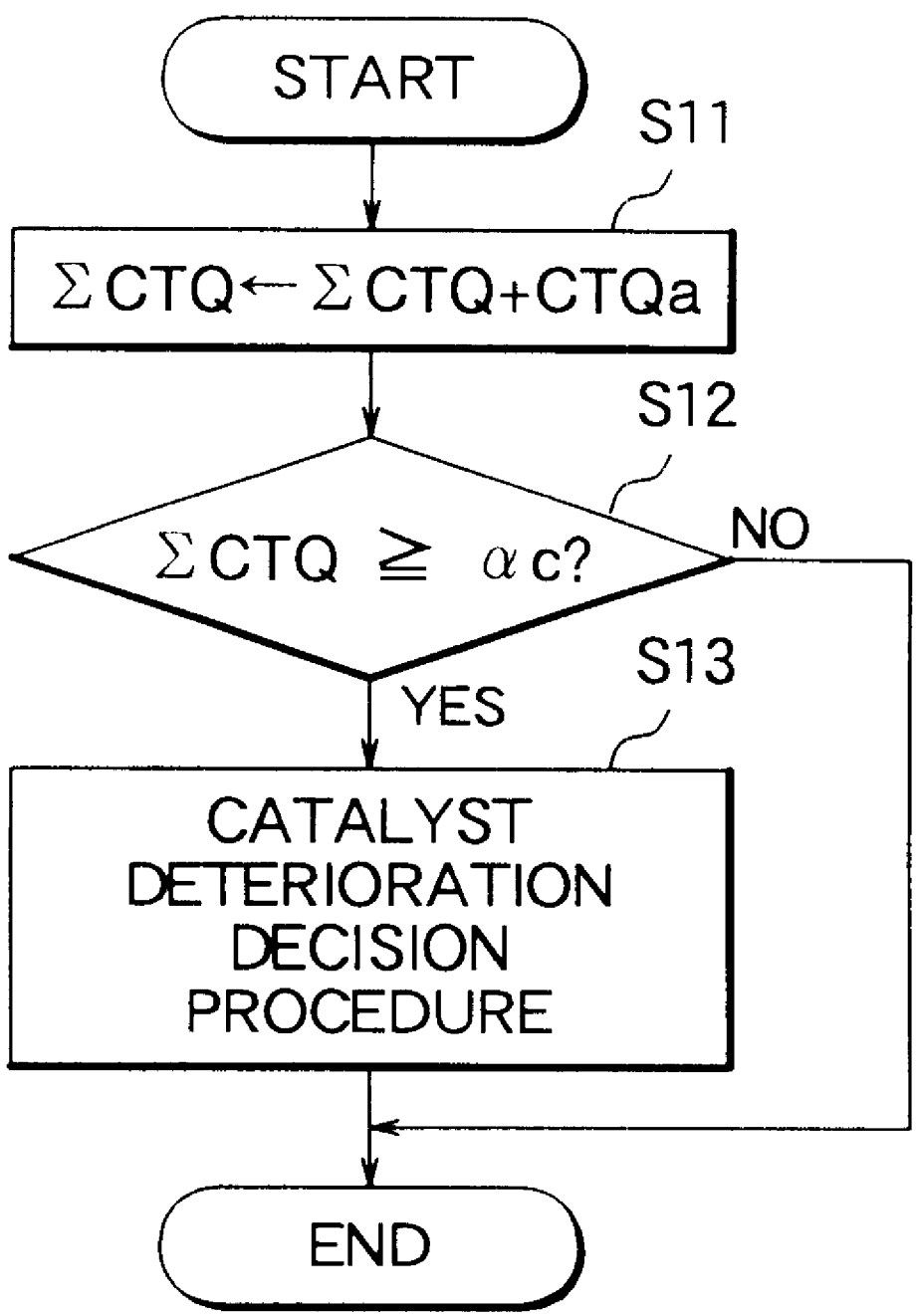
FIG. 4 is a flow chart for illustrating an accumulating processing procedure executed in the catalyst deterioration detecting apparatus according to the third embodiment of the invention.

Now, referring to FIGS. 3 and 4, description will be directed to a catalyst deterioration detecting apparatus according to a third embodiment of the invention in which a data table or map for arithmetic operation is provided in association with the accumulating means 32. FIG. 3 is a view for illustrating, by way of example, a data map according to the third embodiment of the invention, and FIG. 4 is a flow chart for illustrating an accumulated value determining operation in the catalyst deterioration detecting apparatus now concerned.

The structure of the catalyst deterioration detecting apparatus as a whole is substantially same as the one shown in FIG. 1 except that the data map for arithmetic operation (see FIG. 3) is additionally provided in association with the accumulating means 32 for determining the counter value.

The accumulating means 32 in the catalyst deterioration detecting apparatus according to the instant embodiment is so designed as to set the counter value CTQa to "1" (zero) when the intake air quantity Qa is 0 g/sec or 10 g/sec during a predetermined period, as can be seen in FIG. 3.

On the other hand, when the intake air quantity Qa becomes equal to or exceeds 20 g/sec, the counter value CTQa is first set to "6" and subsequently increased gradually.

For the intake air quantity Qa exceeding a value of 40 g/sec, the counter value CTQa to be set is increased at higher rate because of significant influence of such large intake air quantity Qa to the catalyst temperature.

In this conjunction, it should be mentioned that the counter values CTQa are previously set optimum on an engine-by-engine basis by taking into consideration the difference in the degree of influence of the intake air quantity Qa to the catalyst temperature, because the mechanical structure of the exhaust pipe 15 may practically differ from one to another engine.

Next, referring to FIG. 4, description will turn to the accumulating procedure executed in the catalyst deterioration detecting apparatus according to the third embodiment of the invention.

By referencing the data map, the accumulating means 32 determines the counter value CTQa which corresponds to magnitude or degree of the actual influence to the catalyst temperature on the basis of the intake air quantity Qa available from the output of the engine load detecting means 31.

Subsequently, the accumulating means 32 adds sequentially or accumulates the counter values CTQa to thereby arithmetically determine the accumulated value ΣCTQ (step S11 in FIG. 4), whereon decision is made as to whether or not the accumulated value ΣCTQ is equal to or greater than a predetermined value $\underline{\alpha c}$ which corresponds to the operative temperature of the catalyst 10 (step S12).

When it is decided that the accumulated value ΣCTQ is smaller than the predetermined value $\underline{\alpha c}$ or ΣCTQ<αc (i.e., when the decision step S12 results in "NO"), the procedure illustrated in FIG. 4 is terminated without any further processing, whereon return is made to the start-ready state (START). On the other hand, when decision is made in the step S12 that the accumulated value ΣCTQ is equal to or greater than the predetermined value $\underline{c}$ or ΣCTQ≧αc (i.e., when the decision step S12 results in "YES"), the catalyst deterioration decision processing described hereinbefore (see FIG. 13) is executed (step S3), whereon the processing procedure illustrated in FIG. 3 comes to an end (END).

In this way, according to the invention incarnated in the instant embodiment, the counter value CTQa is set at a small value for the intake air quantity Qa exerting a little influence to the temperature rise of the catalyst 10 while the counter value CTQa is set at a large value for the intake air quantity Qa exerting significant influence to the temperature rise of the catalyst 10 by referencing the data map for arithmetic operation. Owing to this feature, the catalyst temperature can be estimated with high accuracy.

Furthermore, by employing the data map for arithmetic operation, the counter value CTQa can be so set as to compensate for the variances in the mechanical parameters among the engines. Thus, the catalyst deterioration decision can be realized with much enhanced reliability.

EMBODIMENT 4

In the catalyst deterioration detecting apparatus according to the third embodiment of the invention, the accumulated value ΣCTQ is determined without taking into consideration the actual intake air quantity Qa (parameter value). In this conjunction, the accumulated value ΣCTQ may be determined only at a time point when the intake air quantity Qa has attained or exceeds a predetermined value.

A fourth embodiment of the present invention is directed to a catalyst deterioration detecting apparatus in which when the intake air quantity Qa reaches or exceeds a predetermined value, arithmetic determination of the accumulated value is performed. This embodiment will be described by reference to FIGS. 5 and 6, in which FIG. 5 is a functional block diagram showing a catalyst deterioration detecting apparatus according to the fourth embodiment of the present invention, and FIG. 6 is a flow chart for illustrating the accumulated value determination processing according to the fourth embodiment.

Figure 5:
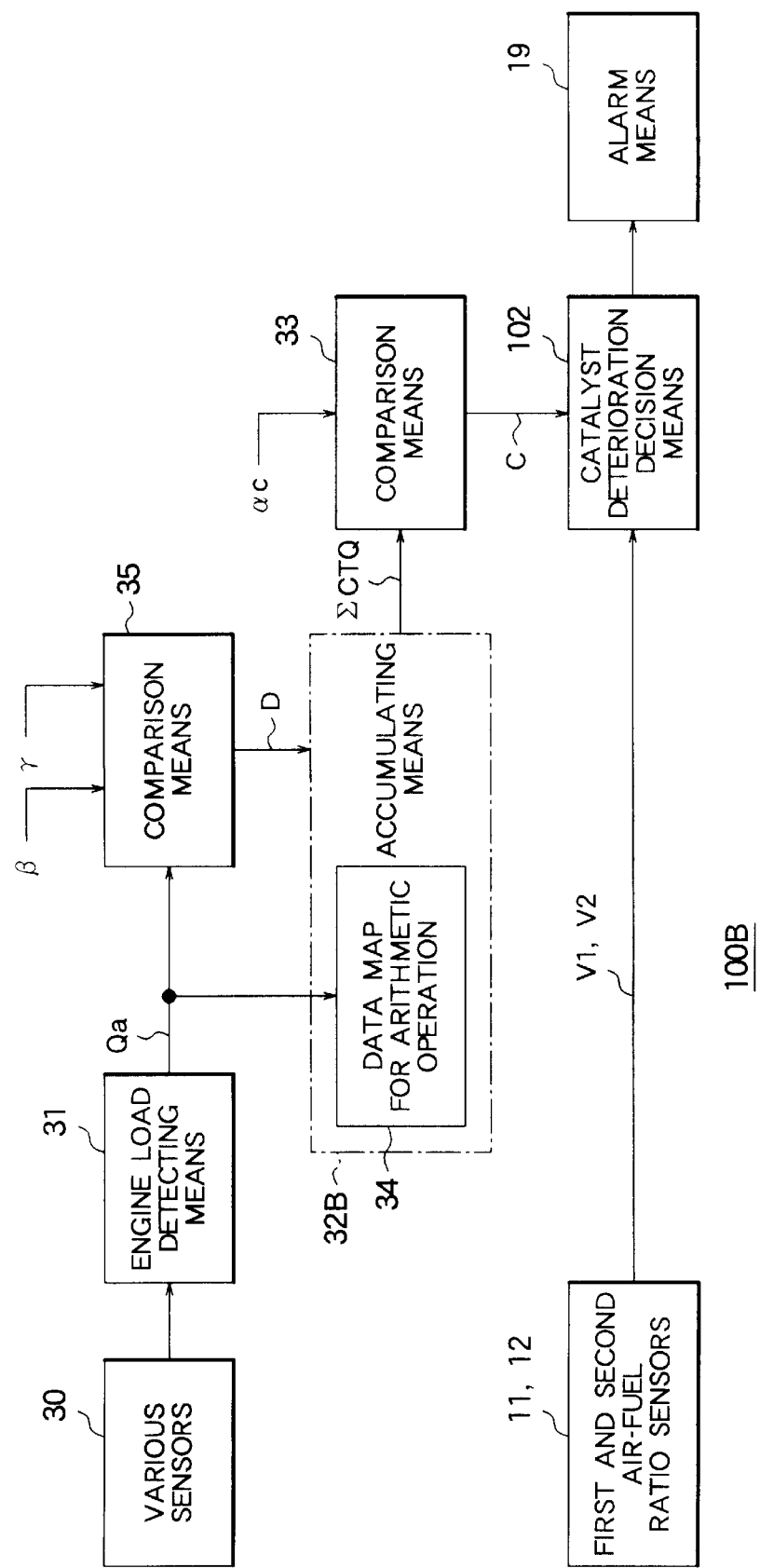
FIG. 5 is a functional block diagram showing a general arrangement of a catalyst deterioration detecting apparatus according to a fourth embodiment of the present invention.
Figure 6:
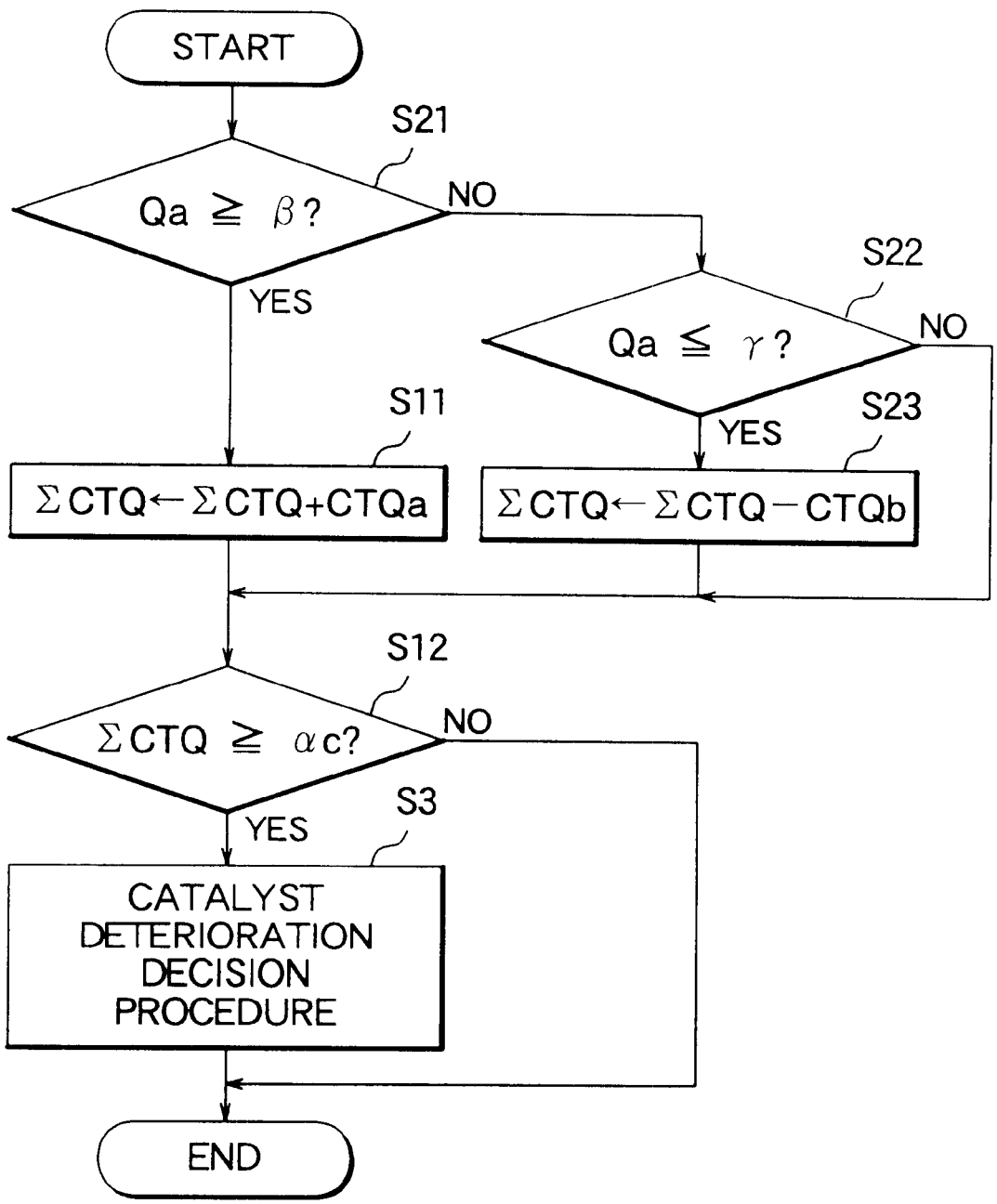
FIG. 6 is a flow chart for illustrating an accumulating processing procedure executed in the catalyst deterioration detecting apparatus according to the fourth embodiment of the invention.

In FIG. 5, like parts or components as those described hereinbefore by reference to FIG. 1 are denoted by like reference symbols, and repeated description thereof is omitted.

An accumulating means 32B and an electronic control unit (ECU) 100B correspond, respectively, to the accumulating means 32 and the ECU 100A mentioned previously.

The accumulating means 32B including a data map 34 for arithmetic operation which is similar to that described previously by reference to FIG. 3 is designed to arithmetically determine an accumulated value ΣCTQ of the counter values CTQa.

It should however be noted that the data map 34 contains not only addition-destined counter values CTQa but also subtraction-destined counter values CTQb, as will be described hereinafter.

A comparison means 35 disposed between the engine load detecting means 31 and the accumulating means 32B is constituted essentially by a pair of comparison means and designed to compare the intake air quantity Qa with predetermined values β and γ where (γ<β), to thereby send to the accumulating means 32B the result D of the comparison with these predetermined values β and γ, respectively.

The predetermined values β and γ serve as reference values for comparison, wherein the predetermined value β is a value related to a temperature rise state of the catalyst 10 while the predetermined value γ is a value relevant to a temperature fall state of the catalyst 10.

More specifically, the state where the intake air quantity Qa is equal to or greater than the predetermined value β is regarded as the state in which the catalyst temperature is rising while the state where the intake air quantity Qa is not greater than the predetermined value γ is regarded as the state in which the catalyst temperature is falling or lowering.

Next, referring to FIG. 6, description will be directed to the accumulated value determining operation of the catalyst deterioration detecting apparatus according to the instant embodiment.

The procedure illustrated in FIG. 6 includes implicitly operation of the comparison means 35 as well. Parenthetically, the steps similar to those described hereinbefore by reference to FIG. 4 are affixed with like step numbers and repeated description in detail of these steps is omitted.

The comparison means 35 makes decision as to whether or not the intake air quantity Qa attains or exceeds the predetermined value β (step S21). When it is decided that the intake air quantity Qa has attained or exceeded the predetermined value β (i.e., when the decision step S21 is affirmative "YES"), the comparison means 35 outputs to the accumulating means 32B a signal indicating this result D of comparison (hereinafter also referred to as the comparison result signal D). Needless to say, the signal D indicates the temperature rise state of the catalyst in which the catalyst is operative.

Upon reception of the comparison result signal D, the accumulating means 32B executes the accumulated value determining processing in a step S11 while the comparison means 33 executes the comparison processing in a step S12, as described previously (in FIG. 4), whereby at a time point when the catalyst temperature reaches the activation or operation temperature at which the catalyst is operative, an activation signal C (activation flag "1") is outputted from the comparison means 33. In response to this signal C, the catalyst deterioration decision processing is executed by the catalyst deterioration decision means 102 (step S3).

On the other hand, when it is decided in the step S21 that the intake air quantity Qa is smaller than the predetermined value β (i.e., when the decision step S21 is negative "NO"), indicating that the catalyst is not in the temperature rise state, the comparison means 35 then decides whether or not the intake air quantity Qa is equal to or smaller than the predetermined value γ (step S22).

When decision is made in the step S22 that the intake air quantity Qa is not greater than the predetermined value γ or Qa≦γ (i.e., "YES" in the step S22), the comparison means 35 outputs the comparison result signal D indicating the temperature fall state of the catalyst.

In response to this comparison result signal D, the accumulating means 32B determines the subtraction-destined counter value CTQb corresponding to the current intake air quantity Qa by referencing the data map 34 for arithmetic operation to thereby subtract the corresponding counter value CTQb from the accumulated value ΣCTQ (step S23), whereon the processing proceeds to the comparison step S12.

By contrast, when decision is made that the intake air quantity Qa is greater than the predetermined value γ or Qa>γ (i.e., "NO" in the step S22), the comparison means 35 outputs the comparison result signal D indicating that the intake air quantity Qa is in a range where the catalyst temperature is held (i.e., β>Qa>γ).

Consequently, the accumulating means 32B does not execute the arithmetic operation processing for determining the accumulated value ΣCTQ in the step S23 but maintains or holds the current accumulated value ΣCTQ as it is, whereon the processing proceeds to the step S12.

As can be understood from the foregoing description, the accumulating means 32B adds the counter value CTQa to the accumulated value ΣCTQ when the intake air quantity Qa becomes equal to or greater than the predetermined value β, whereas the accumulating means 32B subtracts the counter value CTQb from the accumulated value ΣCTQ when the intake air quantity Qa is equal to or smaller than the predetermined value γ. On the other hand, the accumulated value ΣCTQ is held as it is when the intake air quantity Qa is smaller than the predetermined value β and greater than the predetermined value γ (i.e., β>Qa>γ).

As is apparent from the foregoing, even in the case where the intake air quantity Qa is small (i.e., even in the state where the catalyst temperature is lowering or falling), the intake air quantity (low rate) can be reflected in the accumulated value ΣCTQ. Thus, the actual catalyst temperature can be estimated with higher accuracy.

Besides, owing to setting of the range in which the accumulated value ΣCTQ is maintained as it is, the frequency of the chance of detecting deterioration of the catalyst can be increased.

EMBODIMENT 5

In the catalyst deterioration detecting apparatus according to the fourth embodiment of the invention, the range where the accumulated value ΣCTQ is to be held or maintained is provided. In a catalyst deterioration detecting apparatus according to a fifth embodiment of the invention, the range mentioned above is not provided. Thus, when decision is made in the step 21 that the intake air quantity Qa is smaller than the predetermined value β, the procedure proceeds immediately to the step 23 where the subtraction processing of the accumulated value ΣCTQ described in conjunction with the fourth embodiment is executed.

EMBODIMENT 6

In the catalyst deterioration detecting apparatus according to the fourth embodiment of the invention, the data map 34 for arithmetic operation is provided for the accumulating means 32B to arithmetically determine the accumulated value ΣCTQ by using the counter values CTQa and CTQb. However, in a catalyst deterioration detecting apparatus according to a sixth embodiment, the apparatus is so designed that the intake air quantity Qa is directly reflected in the accumulated value ΣQ described hereinbefore in conjunction with in the first embodiment without using the data map 34.

EMBODIMENT 7

In the catalyst deterioration detecting apparatus according to the fourth embodiment of the invention, no description has been made concerning the concrete values of the subtraction-destined counter value CTQb. However, when the intake air quantity Qa is equal to or smaller than the predetermined value γ, the subtraction-destined counter value CTQb may be set variable in dependence on the accumulated value ΣCTQ at the time point the intake air quantity Qa is detected.

Figure 7:
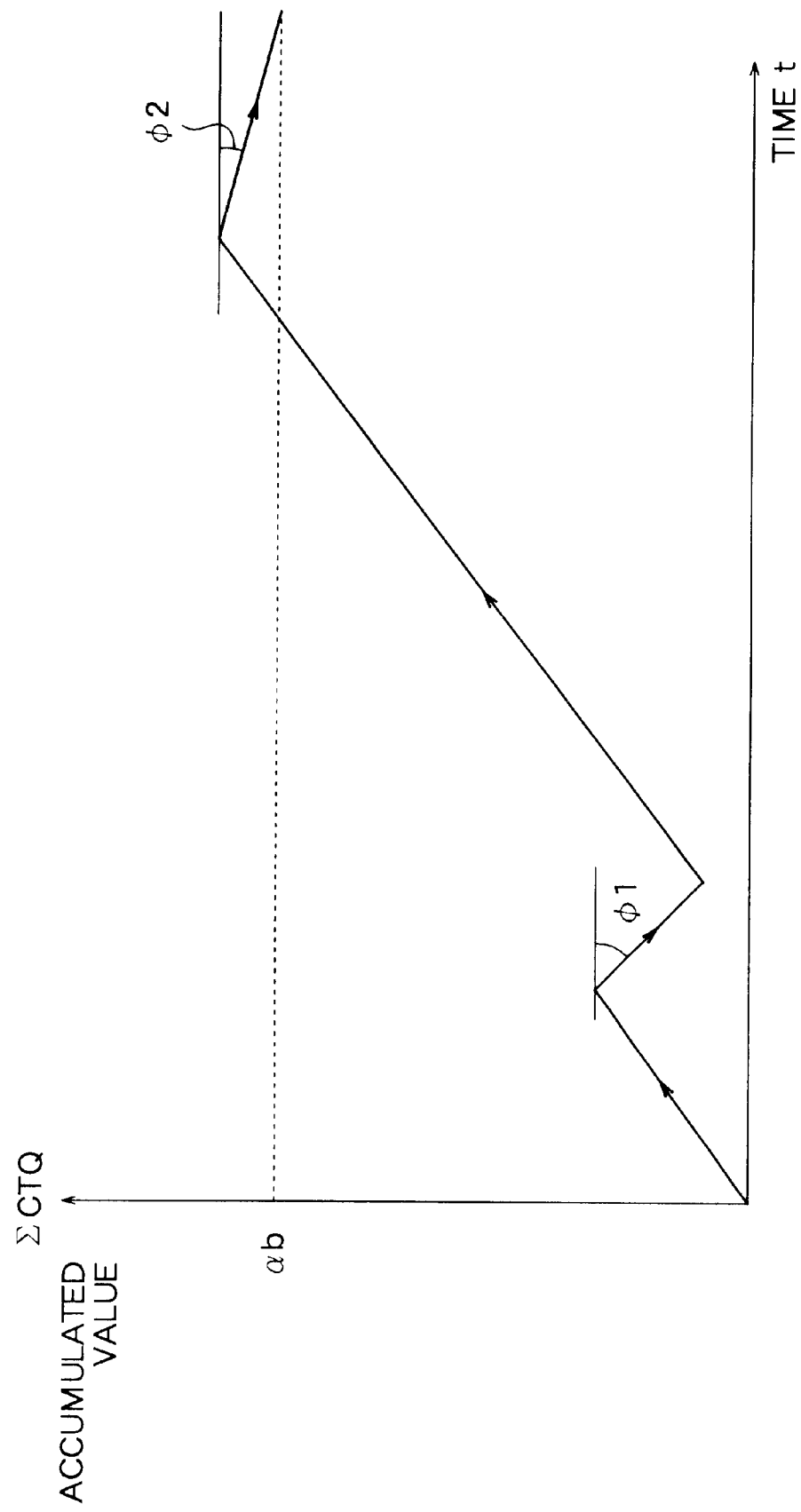
FIG. 7 is a view showing graphically change of an accumulated value as a function of time lapse for illustrating operation of a catalyst deterioration detecting apparatus according to a seventh embodiment of the invention.

FIG. 7 is a view for graphically illustrating change of the accumulated value as a function of time lapse in the catalyst deterioration detecting apparatus according to a seventh embodiment of the invention in which the subtraction-destined counter value CTQb is set variable in dependence on the accumulated value ΣCTQ.

Parenthetically, the structure and processing operations of the catalyst deterioration detecting apparatus now under consideration are for the most part similar to those described hereinbefore by reference to FIGS. 5 and 6.

In the apparatus now concerned, the accumulating means 32B is so designed as to set variable the subtraction-destined counter value CTQb in dependence on the accumulated value ΣCTQ at the time point the intake air quantity Qa is detected, when it is decided in the step S22 that the intake air quantity Qa is equal to or smaller than the predetermined value γ.

More specifically, the accumulating means 32B sets the subtraction-destined counter value CTQb to be smaller as the accumulated value ΣCTQ is larger.

In FIG. 7, angles of slope φ1 and φ2 at the time points the accumulated value ΣCTQ decreases represent magnitudes of the subtraction-destined counter values CTQb, wherein when the accumulated value ΣCTQ is small, the slope angle φ1 (counter value) is set to be large, whereas when the accumulated value ΣCTQ is large, the slope angle φ2 (counter value) is set to be small.

Thus, in the engine operation range where the accumulated value ΣCTQ is small and where deterioration of the catalyst is likely to be erroneously detected, the accumulated value ΣCTQ decreases at a high rate if the intake air quantity Qa is small (i.e., when Qa≦γ). As a result of this, the accumulated value ΣCTQ is suppressed from increasing, whereby erroneous detection of deterioration of the catalyst can be excluded positively.

By contrast, in the engine operation range where the accumulated value ΣCTQ is large and where the erroneous detection of deterioration of the catalyst is unlikely to occur, the accumulated value ΣCTQ is suppressed in respect to the decreasing rate even if the intake air quantity Qa is small (i.e., even when Qa≦γ). Thus, the accumulated value ΣCTQ is suppressed from decreasing, whereby frequency of the chance of detecting deterioration of the catalyst can be increased.

At this juncture, it should be mentioned that once the catalyst temperature has risen up to the operative level, decision concerning the activated state of the catalyst 10 can not be influenced even if the catalyst temperature falls subsequently more or less.

In general, it is desirable that detection of the catalyst temperature (activated state of the catalyst) be performed in a high engine-load state when the intake air quantity Qa is large while detection of deterioration of the catalyst be carried out in a low engine-load state when the intake air quantity Qa is small. Thus, the activated state determined in the high engine-load state should preferably be sustained or held in the low engine-load state, because then the frequency of the chance of detecting deterioration of the catalyst can increase ideally.

EMBODIMENT 8

In the catalyst deterioration detecting apparatus according to the fourth embodiment of the invention, the accumulating means 32B is designed to operate on the presumption that the engine 1 is operated in the air-fuel ratio feedback control mode (i.e., with the stoichiometric ratio of 14.7). In this conjunction, it should however be mentioned that the accumulating means 32B may be so designed that the function thereof is positively inhibited in the other predetermined operation ranges.

Ordinarily, in the air-fuel ratio feedback control mode, the air-fuel ratio can be controlled with high accuracy. Accordingly, the catalyst temperature can precisely be estimated on the basis of the intake air quantity Qa, the parameter indicative of the engine load. However, in the other predetermined engine operation ranges, variable factors as involved become more remarkable, as a result of which reliability of the arithmetic operation processing for determining the accumulated value ΣCTQ corresponding to or representing the catalyst temperature is degraded, giving rise to the possibility that error may be incurred only with the estimation based on the intake air quantity Qa.

The eighth embodiment of the present invention is directed to a catalyst deterioration detecting apparatus in which the arithmetic processing for determining the accumulated value is interrupted or suspended when the engine 1 is operating in predetermined operation ranges. The eighth embodiment will now be described below in detail by reference to FIG. 8.

According to the teaching of the invention incarnated in the instant embodiment, the accumulating means 32B (see FIG. 5) is so designed as to interrupt or suspend the arithmetic processing for determining the accumulated value when the operation state of the engine 1 falls within a predetermined operation range or ranges.

In the apparatus according to the instant embodiment of the invention, the ECU denoted by reference character 100B is comprised of a control means for determining arithmetically control parameters for the engine 1 (e.g. parameters represented by the driving signals for the fuel injector 5, the ignitor 14 and the like) on the basis of detection signals derived from the outputs of the various sensors denoted collectively by reference numeral 30 and the air-fuel ratio signals V1 and V2, and an engine operation state decision means for making decision on the basis of the signals available from the various sensors and the result of the arithmetic operation of the control means as to whether or not the operation state of the engine 1 falls within a predetermined operation range or ranges.

Furthermore, the ECU 100B includes a fuel-cut mode decision means for deciding whether or not the operation state of the engine 1 is in a fuel-cut mode. On the other hand, the accumulating means 32B is so designed as to execute the arithmetic operation for determining the accumulated value $\Sigma CTQ$ to thereby perform subtraction of the accumulated value $\Sigma CTQ$ so long as the engine is operating in the fuel-cut mode even if the air-fuel ratio feedback control mode is not effectuated.

Figure 8:
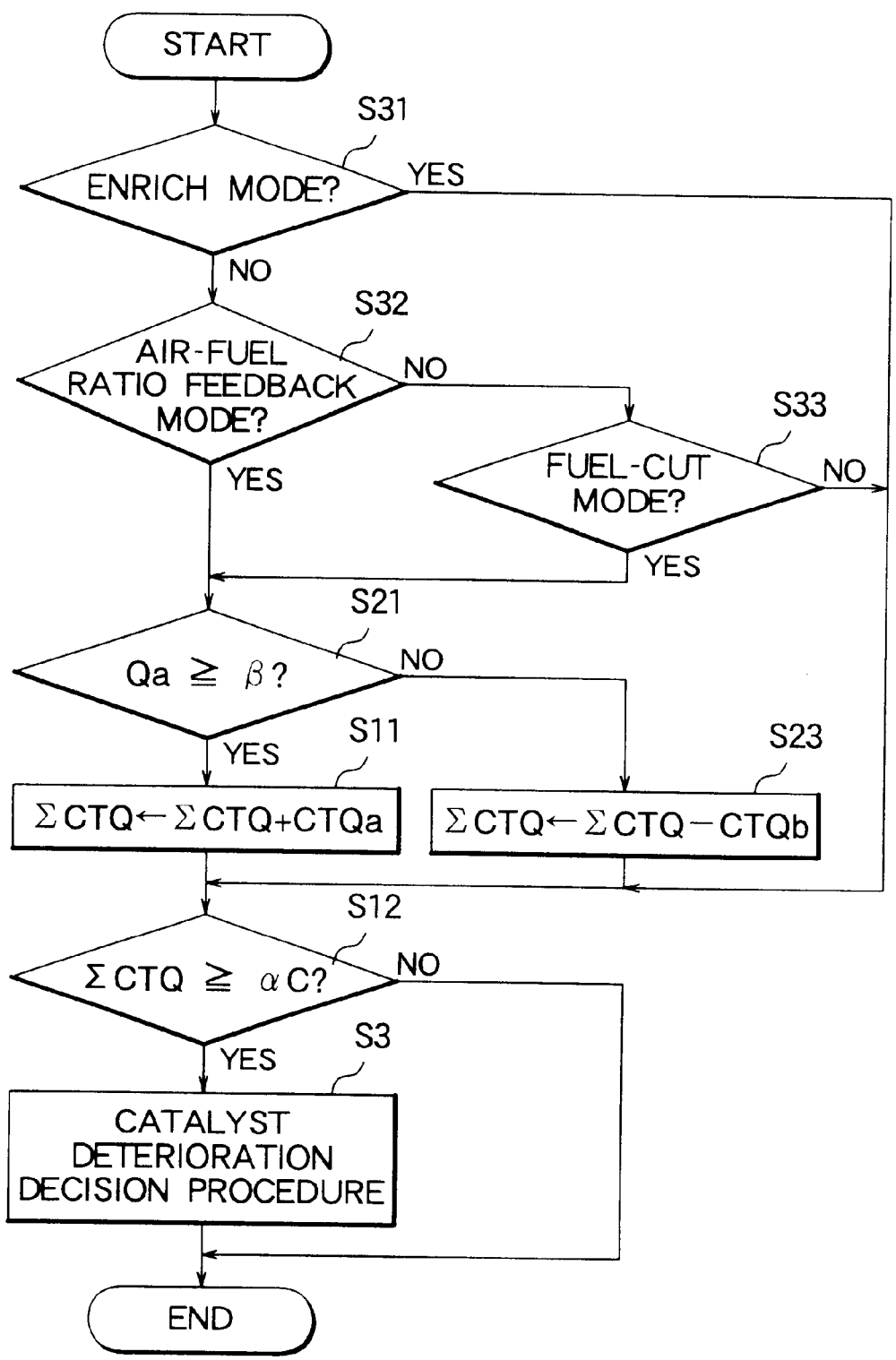
FIG. 8 is a flow chart for illustrating operation of a catalyst deterioration detecting apparatus according to an eighth embodiment of the invention.

FIG. 8 is a flow chart for illustrating processing procedure executed in the catalyst deterioration detecting apparatus according to the eighth embodiment of the invention. Parenthetically, the processing steps similar to those described hereinbefore are designated by like step numbers and repeated description in detail of these steps are omitted.

Referring to FIG. 8, steps S31 to S33 are processing steps which are executed by the engine operation state decision means.

Referring to FIG. 8, the engine operation state decision means decides at first whether or not the current operation state of the engine 1 is in an enrich mode in which the engine is operated at a high speed or in an accelerated mode (step S31). When it is decided that the engine operation is in the enrich mode (i.e., when the decision step S31 results in "YES"), then it is regarded that the engine is operating within the so-called predetermined operation range, whereupon the processing proceeds immediately to the catalyst activation temperature decision step S12.

In this decision step S12, the arithmetic processing procedure for determining the accumulated value $\Sigma CTQ$ performed by the accumulating means 32B (steps S11 and S23) is interrupted or skipped, for thereby maintaining or holding the accumulated value $\Sigma CTQ$ at the current value, ordinarily, in the enrich mode, the amount or quantity of fuel injected into the engine is larger than that in the air-fuel ratio feedback control mode. Consequently, the intake air quantity Qa is large as well. In that case, however, the temperature of the exhaust gas decreases because heat is deprived of therefrom due to vaporization of the fuel. Thus, the enrich mode can be effectuated for suppressing the increase of the engine temperature.

As can be understood from the above, a large quantity of the intake air in the enrich mode does not contribute to the increase of the catalyst temperature. Consequently, the actual catalyst temperature can be reflected in the accumulated value $\Sigma CTQ$ with high accuracy by holding the accumulated value $\Sigma CTQ$ as is without increasing it.

On the other hand, when it is decided in the step S31 that the engine is not operating in the enrich mode (i.e., when the answer of the step S31 is "NO"), then decision is made in succession as to whether or not the engine is operating in the air-fuel ratio feedback control mode (step S32).

If it is found that the engine is operating in the air-fuel ratio feedback control mode (i.e., when the decision step S32 results in "YES"), the arithmetic processing for determining the accumulated value $\Sigma CTQ$ (steps S21, S11 and S23) are executed by the accumulating means 32B, as described hereinbefore.

On the contrary, if it is decided in the step S32 that the engine is not operating in the air-fuel ratio feedback control mode (i.e., when the answer of the step S32 is "NO"), then decision is made in succession as to whether or not the engine operation state is in the fuel-cut mode which is validated for decelerating the engine operation (step S33).

Unless the fuel-cut mode is decided (i.e., when the step S33 results in "NO"), the engine is regarded as operating in the so-called other predetermined operation range. In that case, the arithmetic processings for determining the accumulated value $\Sigma CTQ$ is skipped, whereon the processing proceeds straightforwardly to the catalyst activation temperature decision routine (step S12).

In this manner, so long as the engine is operating in the other modes than the air-fuel ratio feedback control mode, the engine is regarded as operating within the so-called predetermined operation range, and hence the arithmetic processing for determining the accumulated value $\Sigma CTQ$ is inhibited with the accumulated value $\Sigma CTQ$ being held at the current value as it is. As the result of this, error can be suppressed in the arithmetic operation, whereby the actual catalyst temperature can be estimated with high accuracy.

By contrast, when it is decided in the step S33 that the engine is operating in the fuel-cut mode (i.e., when the step S33 results in "YES"), the arithmetic processing for determining the accumulated value $\Sigma CTQ$ (step S21) is executed.

In general, in the fuel-cut mode effectuated for deceleration of the engine operation, the throttle valve 7 (see FIG. 1) is fully closed with the intake air quantity Qa being reduced. Accordingly, in the step S21, it is decided that the intake air quantity Qa is short of the predetermined value $\beta$ or Qa<$\beta$ (i.e., the answer of the step S21 is "NO"). In that case, the processing proceeds to the subtraction processing of the accumulated value $\Sigma CTQ$ (step S23).

As can be understood from the above, in the fuel-cut mode in which the catalyst temperature falls or lowers due to decrease of the intake air quantity Qa, the accumulating means 32B executes the subtraction processing for the accumulated value $\Sigma CTQ$. Thus, the accumulated value $\Sigma CTQ$ can reflect the actual catalyst temperature value with high accuracy, which can ensure the catalyst deterioration determination with high accuracy at the time point the catalyst 10 is heated to the activated temperature.

In the foregoing description of the eighth embodiment, it has been presumed that the decision steps S31, S32 and S33 shown in FIG. 8 are executed sequentially in one and the same routine. However, any one of these decision steps may be executed discretely.

In that case, the arithmetic processing for determining the accumulated value $\Sigma CTQ$ will be executed discretely or separately in each engine operation mode.

Furthermore, in conjunction with the catalyst deterioration detecting procedure illustrated in FIG. 8, it has been presumed that the counter value CTQa or CTQb is added or subtracted to or from the accumulated value ΣCTQ in dependence on the intake air quantity Qa. However, the invention can equally find application to such a scheme that only the processing for adding the counter value CTQa to the accumulated value ΣCTQ is executed while the processing for subtracting counter value CTQa from the accumulated value ΣCTQ is spared.

Besides, it goes without saying that the present invention incarnated in the instant embodiment can also be applied to the case where the accumulated value ΣQ is determined by using the intake air quantity Qa itself as the counter value, as described hereinbefore by reference to FIGS. 1 and 2.

Many features and advantages of the present invention are apparent from the detailed description and thus it is intended by the appended claims to cover all such features and advantages of the apparatus which fall within the true spirit and scope of the invention. Further, since numerous modifications and combinations will readily occur to those skilled in the art, it is not intended to limit the invention to the exact construction and operation illustrated and described.

Accordingly, all suitable modifications and equivalents may be resorted to, falling within the spirit and scope of the invention.

What is claimed is:

1. A catalyst deterioration detecting apparatus for an internal combustion engine, comprising:

an engine load detector operable to arithmetically determine parameter values corresponding to load states of an internal combustion engine;

an accumulator operable to arithmetically determine an accumulated value by accumulating counter values corresponding to said parameter values;

a first comparator operable to compare said accumulated value with a first predetermined value corresponding to an operative temperature of a catalytic converter; and a catalyst deterioration determiner operable to determine a deterioration of said catalytic converter when said accumulated value attains or exceeds said first predetermined value, wherein said counter values are selected from values that can be preset to any desired value and a functional relationship exists that associates said counter values with said parameter values.

2. A catalyst deterioration detecting apparatus for an internal combustion engine according to claim 1, said accumulating means including:

a data map for determining arithmetically a counter value corresponding to said parameter value.

3. A catalyst deterioration detecting device comprising:

a parameter detector operable to determine a parameter value;

preset means operable to provide an output value selected from preset values according to the parameter value;

an accumulator operable to accumulate successive output values from said preset means;

a first comparator operable to compare an accumulated value from said accumulator with a first predetermined threshold value; and a decision device operable to determine whether the catalyst has suffered deterioration, wherein the determination is based on a result from said first comparator.

4. A catalyst deterioration detecting device as claimed in claim 3, wherein the catalyst deterioration detecting device is used to detect catalyst deterioration in a catalytic converter of an internal combustion engine.

5. A catalyst deterioration detecting device as claimed in claim 4, wherein the first predetermined threshold value corresponds to a catalyst operation temperature at which the catalytic converter is operative.

* * * * *